Patented July 3, 1951

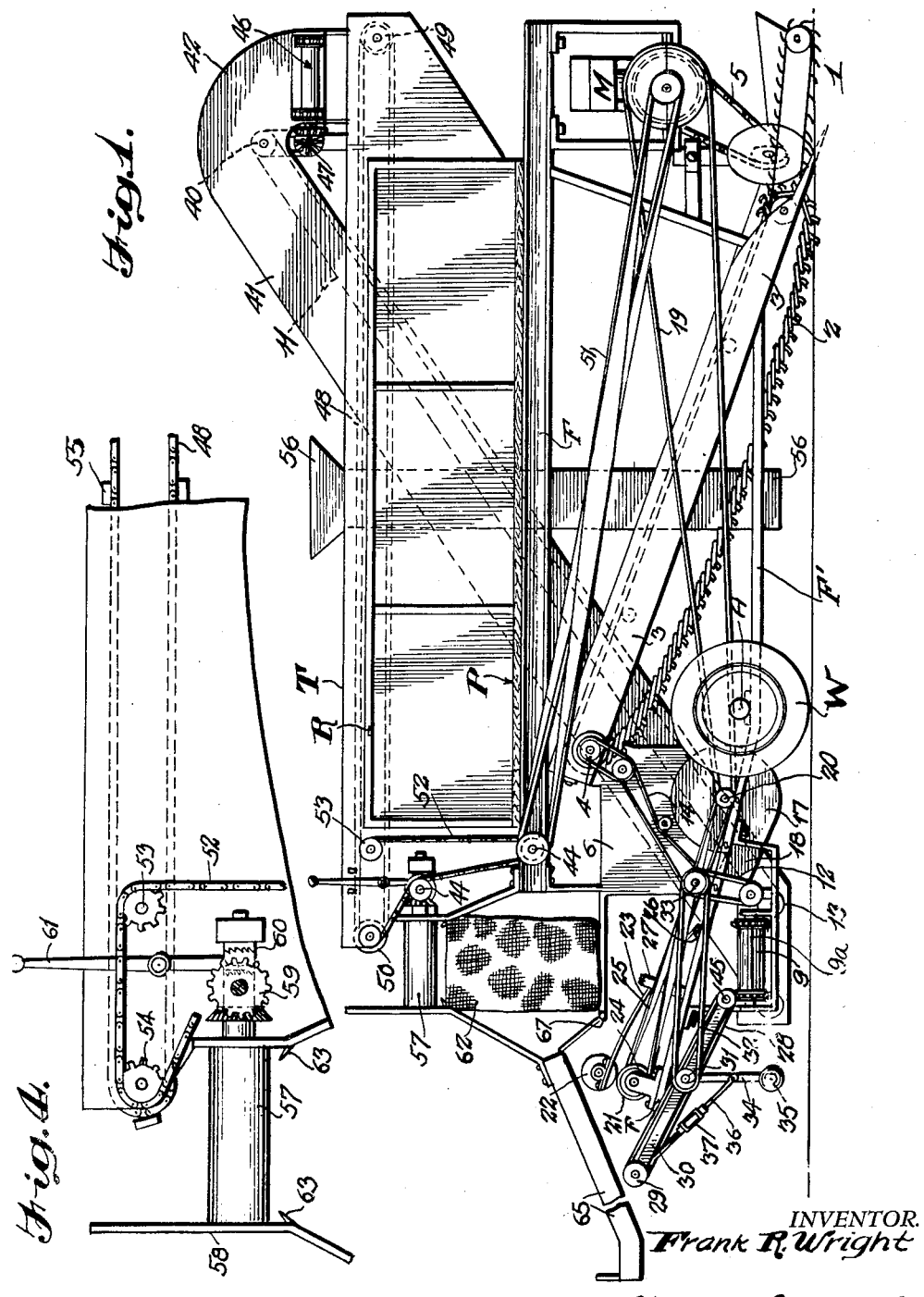

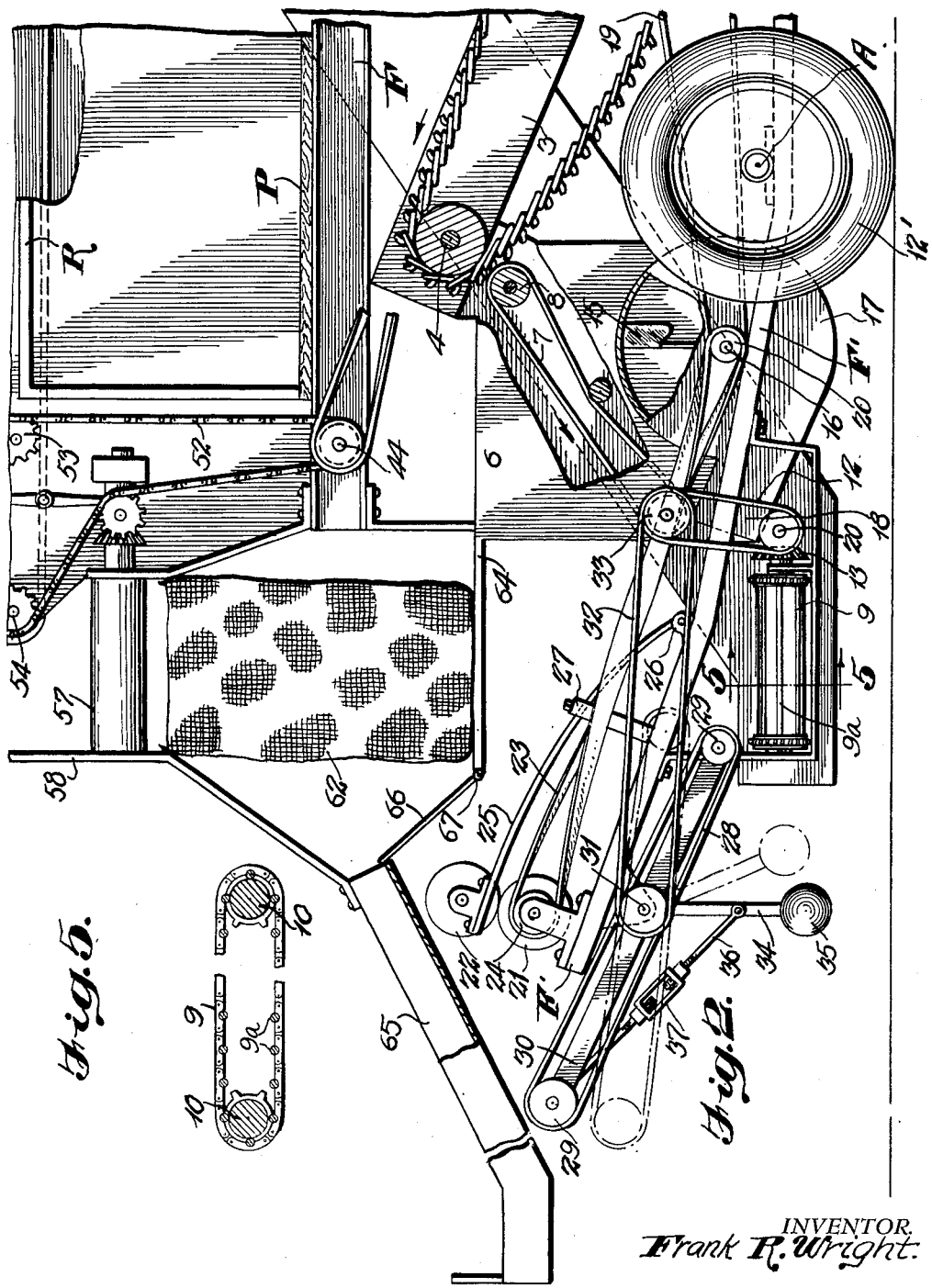

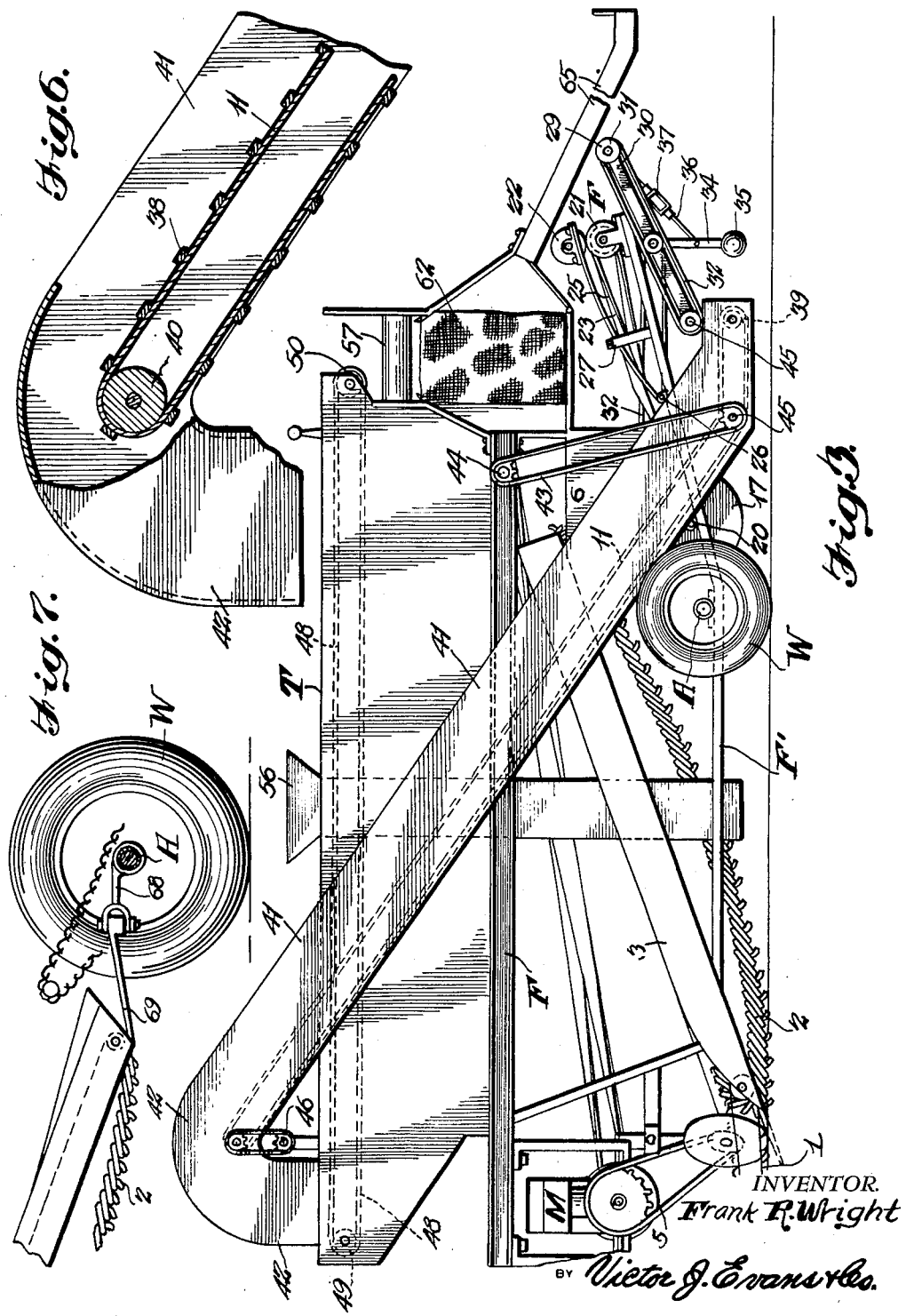

2,558,894

UNITED STATES PATENT OFFICE 2,558,894

POTATO HARVESTER AND CLEANER

Frank R. Wright, Nezperce, Idaho

Application November 4, 1946, Serial No. 707,614

1 Claim. (Cl. 130—30)

My present invention relates generally to harvesters and more specifically to a potato harvester and cleaner in the nature of a wheeled vehicle or implement adapted to be hitched or coupled to and propelled by a four-row potato digger. The invention is embodied in a wheeled implement that is adapted to receive the harvested crop from the digger, and it is power operated for stripping the vines and soil from the potatoes, and provided with the necessary equipment whereby the potatoes may be graded and sorted by hand, and finally the potatoes may be deposited in sacks or other receptacles.

As hereinafter described the implement is attached at the rear of a power operated potato harvester of the four-row digger type, but it will be understood that the attachment of my invention may be coupled or hitched to machines harvesting crops from one or more rows.

The primary object of the invention is the provision of a power operated machine or attachment for a harvester, in which the component parts of the machine are combined and arranged in compact formation to facilitate the several operations performed by the power operated machine, and also by hand, in preparing the potatoes for the market.

The invention consists essentially in certain novel combinations and arrangements as will hereinafter be described, and more specifically set forth in the appended claims.

In the accompanying drawings I have illustrated one complete example of the physical embodiment of my invention wherein the parts are combined and arranged in accord with one mode I have thus far devised for the practical application of the principles of my invention. It will, however, be understood that changes and alterations may be made in these exemplifying drawings and mechanical structures, within the scope of my claim, without departing from the principles of the invention.

Figure 1 is a view in elevation at the right side of the implement embodying my invention.

Figure 2 is an enlarged view in elevation at the right side of the implement, showing only the rear portion, or sacking-end of the implement.

Figure 3 is a view in elevation at the left side of the implement.

Figure 4 is an enlarged fragmentary view disclosing the manual control mechanism for the sacking of the potatoes.

Figure 5 is a detail sectional view at line 5—5 of Fig. 2 illustrating the chain separator conveyor.

Figure 6 is an enlarged detail sectional view at the upper end of the elevator.

Figure 7 is a detail sectional view through the axle of the implement, showing one of its wheels, and supporting connections therefrom for one of the conveyors.

In carrying out my invention I utilize a well balanced implement having a main horizontal frame F with an elevated platform or deck P, which is provided with a guard rail R for the sorters and graders, and other operators; and an under-frame F' is provided with bearings in which the axle A is journaled for supporting the laterally spaced wheels W. For providing the power to operate the various conveyors and appliances that form the equipment of the implement, a suitable motor M is mounted in its frame beneath the main frame, and at the front portion of the implement, and from the motor power is transmitted to the various parts of the implement.

By suitable couplings or hitching means the implement is attached at the rear end of the forwardly traveling power-digger, in position to receive the harvested crop of potatoes, as the crop is conveyed by an endless conveyer 1 in Fig. 1 from the digger and delivered to an endless chain draper conveyor 2 that is mounted by rollers in the side boards of a hinged frame 3. This receiving conveyer extends longitudinally and it inclines upwardly to its rear, elevated, pivotal support 4; the lower end of the conveyer receiving power from the motor M through a chain drive mechanism 5.

The rear, elevated, delivery end of the receiving conveyor terminates above an open top housing 6 in which is mounted a declining or slanting longitudinally-arranged feed conveyor 7, preferably an endless belt of rubber, canvas, or other material that will not bruise the potatoes as they contact therewith.

This endless feed conveyor passes around vertically spaced rollers 8, and it is operated by power transmitted through the receiving conveyor 2, to deliver the potatoes, vines, and loose soil and dust in a separating space located above a transversely arranged endless chain separator-conveyor 9; and at this location of the implement the potatoes are cleaned by the removal of the vines, soil and dust.

The transverse separator conveyor 9 is mounted at the rear end of the implement on supporting rollers 10, slightly above the ground level for clearance purposes, and its left or delivery end terminates at the lower end of a longitudinally extending elevator 11 mounted at the left side of the implement.

The endless, transverse separator-conveyor 9 is preferably fashioned with steel or other metallic cross rods 9a that are longitudinally spaced on the conveyor to provide openings through which the loose soil and dust are sifted as they are shaken from the potatoes, while the clean potatoes are carried toward the elevator and deposited thereon. For driving the separator-conveyor a belt drive 12 and gearing 13 are provided receiving power transmitted from the operating mechanism of the feed conveyor 7, that includes the belt drive 14.

As the potato crop is fed to the separation space, the vines, by a pneumatic blast, are blown into a rearwardly extending substantially horizontal position in order that they may positively be gripped and stripped from the potatoes and then disposed of by depositing to the rear of the traveling implement; and the air blast is also instrumental in carrying off other debris from the potatoes.

For this purpose a pneumatic fan-blower 15 is journaled at 16 in a fan casing 17 located in the lower portion of the housing 6, with its outlet 18 in position to direct a blast of air rearwardly through the separating space above the transverse conveyor 9. As best seen in Fig. 1 the fan blower is operated at comparatively high speed, directly from the motor M through a belt drive 19 to the driven pulley 20 of the blower, and the rotating fan spreads the vines upwardly so that their front free ends may be gripped between two stripping rollers 21 and 22, of which the driving roller 21 receives power, through a crossed belt 23, from the pulley 29 of the fan-blower, to driven pulley 24 of the roller.

The driving roller, or power roller 21 is journaled in bearings mounted on the frame F', and the upper driven roller 22 is resiliently mounted on the lower roller as by means of a leaf-spring or spring blade 25, which is mounted at its front end 26 on the frame F', and the spring blade is limited in its range of movement by a guard bracket 27 rigid with the frame.

From this description it will be apparent that the outspread vines are gripped between the transversely extending rolls, and by action of the revolving rolls the vines are stripped from the potatoes and discharged at the rear of the moving implement. The rollers 21 and 22 are made of rubber or other elastic material that will frictionally engage the vines with a firm grip, and the resiliently supported presser roll 22 is adapted to impose or impart the required gripping action for stripping the vines.

While the vines are being stripped from the crop as above described, the potatoes and accompanying debris are suspended in the separating space and driven by the air blast and deposited upon a transfer conveyor by which the cleaned potatoes are deposited upon the transverse separator-conveyor 9 and conveyed to the elevator 11.

The transfer conveyor 28 is an endless belt of canvas or rubber that is supported on rollers 29 mounted in the opposite ends of a frame 30, and the frame 30 is pivotally supported at 31 by brackets beneath the frame F', with a belt drive 32 operated from pulley 33 of the power transmission mechanism of the implement.

The transfer conveyor is suspended beneath the frame F' with the pivotal point or support 31 intermediate its ends, and it is adjustable or tiltable to inclined position beneath the stripping rollers and in line with the air blast from the fan blower for receiving the floating potatoes and debris and discharging them to the transverse separator-conveyor 9.

For varying the inclination of and adjusting the position of the transfer conveyor, its frame 30, at the pivotal point 31 is provided with a depending leg 34 upon which is mounted a counterbalancing weight 35, and a sectional link or brace 36 pivotally connects the leg with one end of the frame 30. The link sections are joined by a turnbuckle 37, and as best seen in Fig. 2 where the pivot point or suspension point 31 of the transfer conveyor is offset from its longitudinal center, the sectional link may be extended or retracted by turning the turn-buckle to balance the conveyor in its adjusted tilted position. The upper flight of the transfer conveyor moves to the rear to carry the loose soil and debris (which are prevented from rolling down the inclined conveyor by the air blast), upwardly and over the rear end of the conveyor and this debris is deposited on the ground at the rear of the moving implement.

The heavier potatoes roll forwardly and downwardly on the transfer conveyor and are deposited upon the upper traveling flight of the transversely disposed separator-conveyor 9, which as before stated, carries the cleaned potatoes to the elevator 11.

The elevator 11 is an endless belt provided with cross slats 38, and it passes over a lower roller 39 and an upper roller 40 journaled transversely in a frame 41 having at its upper end a delivery spout 42, and as seen in Fig. 3, a sprocket chain 43 together with driving sprocket 44 and driven sprocket 45, are provided for operating the elevator.

The elevator carries the cleansed potatoes from the lower rear end of the implement to the upper front end thereof, along the left side of the equipment, and above the front end of the platform or deck P.

At the front of the implement a transversely arranged endless chain conveyor 46 is operated by bevel gear couple 47 actuated from the power transmission system of the implement, and this conveyor is mounted in position to receive the elevated potatoes from the outlet spout 42, and convey them to a longitudinally extending sorting and grading table erected above the deck or platform P at the right side of the implement.

The sorting table includes an endless conveyor 48 passing around rollers 49 and 50 journaled in bearings in the table frame T, and it is driven from the transverse power shaft 44, which derives power from the motor M through belt 51, by drive chain 52 and its sprockets. The conveyor 48 or sorting table is equipped with cross slats 55 for carrying the potatoes, and the culls are picked therefrom by the sorter or grader and dropped into a vertically arranged chute 56 having an upper inlet end and a lower outlet end to deposit the culls upon the ground beneath the implement.

From the rear end of the sorting table the select potatoes are deposited upon a transversely extending endless belt carrier 57 that passes over rollers mounted in an upright frame 58, and this sacking carrier is operated through the bevel-gear couple 59, in connection with a control clutch 60 that is operated by a lever 61 for manual control of the power transmission mechanism of the implement.

One or more sacks as 62 are suspended by their open mouths from supporting hooks 63 of the sacking frame 58, and the sacker stands upon a platform 65 where he is in position to fill the sacks with potatoes from the carrier 57, and deposit the filled sacks in a rearwardly projecting chute 65.

A portion of the discharge chute for the sacks, and the platform 64 are located above the stripping rollers and the air blast from the fan blower, and to prevent escape, upwardly, of the air blast a gate or shutter 66 is hinged at 67 on the platform to confine the blast to its proper course.

Under control of the manually operated lever 61, the power transmission system, actuated from the motor M, transmits motion and power to the various appliances and devices to insure smooth operation of the power operated parts of the implement.

By suitable means, the appliances and devices that are supported in working position close to the ground level, may be elevated to inoperative position while the implement is traveling to and from the field. In Fig. 7 for instance, the endless conveyor 2 may be lifted from its low level and supported in elevated positon from the axle A by means of an arm 68, and a swiveled link 69, and these parts may quickly be detached in order to lower the conveyor to operative position.

Having thus fully described my invention, what I claim as new and desire to secure by Letters Patent is:

In a potato harvester and cleaner, the combination with a longitudinally-extending feed conveyor for conveying potatoes, a transversely-arranged separator conveyor arranged rearwardly of said feed conveyor, a pair of rollers arranged above and to the rear of said separator conveyor for stripping vines from said potatoes, and a rotating fan blower positioned below said feed conveyor for directing a blast of air toward said rollers, of an endless belt transfer conveyor interposed between said rollers and said separator conveyor for delivery of potatoes to the latter, said endless belt transfer conveyor being provided with an off-center pivotal support intermediate its ends, said pivotal support permitting said transfer conveyor to move in a vertical plane, and means for causing pivotal movement of said transfer conveyor, said means comprising a leg dependingly carried by said support, a counterbalancing weight secured to the lower end of said leg, and an adjustable brace connecting said leg to the longer end of said transfer conveyor.

FRANK R. WRIGHT.

REFERENCES CITED

The following references are of record in the file of this patent:

UNITED STATES PATENTS

| Number | Name | Date |
| --- | --- | --- |
| 1,202,737 | Klitzke et al. | Oct. 24, 1916 |
| 1,749,205 | Allen, Sr. et al. | Mar. 4, 1930 |
| 1,784,209 | Timm | Dec. 9, 1930 |
| 1,975,668 | Rodin | Oct. 2, 1934 |
| 2,027,840 | Rodin | Jan. 14, 1936 |
| 2,365,077 | Hertzler et al. | Dec. 12, 1944 |
| 2,468,639 | Sample | Apr. 26, 1949 |